Feb. 15, 1955 C. G. ROPER 2,702,381
ELECTROMECHANICAL INDICATING SYSTEM
Original Filed Oct. 21, 1947 3 Sheets-Sheet 1

Inventor:-
Charles G. Roper
by his Attorneys

Feb. 15, 1955   C. G. ROPER   2,702,381
ELECTROMECHANICAL INDICATING SYSTEM
Original Filed Oct. 21, 1947   3 Sheets-Sheet 3

Inventor:
Charles G. Roper
by his Attorneys.
Darby & Darby

United States Patent Office 2,702,381
Patented Feb. 15, 1955

2,702,381

ELECTROMECHANICAL INDICATING SYSTEM

Charles G. Roper, Fairfield, Conn., assignor to Manning, Maxwell & Moore, Inc., New York, N. Y., a corporation of New Jersey Original application October 21, 1947, Serial No. 781,066, now Patent No. 2,614,163, dated October 14, 1952. Divided and this application August 13, 1952, Serial No. 304,125

12 Claims. (Cl. 340—187)

This invention involves electro-mechanical indicating systems for indicating the magnitude of any variable which can be represented by small electrical values such as for example thermo-couple currents and voltages.

An object of this invention is to provide an electro-mechanical indicator capable of providing large scale indication from low level direct current electrical signals.

Another object of this invention is to provide an electro-mechanical indicator of the type employing electro-mechanical degenerative operation to provide high gain stable direct current amplification for low impedance low current inputs.

Another object of this invention is to provide an electro-mechanical system for continuously indicating the value or the changing values of low value electrical signals representative of the phenomenon being indicated.

Still another object of the invention is to provide in a system of this type combinations in which electrical or mechanical forces are used to produce an amplified output by means of an electrically stabilized relay.

Still another object is to provide in such a system an electro-mechanical force-balance servo mechanism in combination with a high frequency oscillator wherein detuning of the oscillator produces an amplified current to actuate the indicator, and further wherein motion of the indicator is converted into a balancing force applied to the servo mechanism whereby mechanical indication is exactly weighed against the electrical input.

Still another object of this invention is to provide a system of this type in which line variations in the main voltage source cause negligible error in the calibration of the instrument.

Still another object of the invention is to provide in electro-mechanical indicators of this type an arrangement wherein large scale indication is combined with micro-ammeter sensitivity in the measurement of small electrical value representative of the phenomenon being indicated.

Still another object of the invention is to provide an electro-magnetic dampening means responsive to the rate of change of the indicator actuating current to stabilize the instrument, and thereby, prevent over-shooting of the indicator and reduction in its oscillation.

Other and more detailed objects of the invention will be apparent from the following description of the embodiments thereof illustrated in the attached drawings.

This application is a division and continuation-in-part of my copending application Serial No. 781,066, filed October 21, 1947, now Patent No. 2,614,163, issued October 14, 1952, Reissue No. 23,850, July 13, 1954.

In the accompanying drawings,

Figure 1 is a diagrammatic and schematic illustration of an electro-mechanical indicator for indicating changes in magnitude of low value direct current input signals representative of a changing condition to be indicated such as for example temperatures, pressures, rates of fluid flow, and the like;

The indicators herein disclosed employ an electro-mechanical de-generative system to provide high gain stable D. C. amplification for low impedance low current inputs. It will be understood that the low impedance low current inputs comprise electrical signals which may be representative of variations in any condition to be indicated, such as for example changes in temperature, pressure, rates of fluid flow, and the like. Indeed, those skilled in the art will recognize that any variable factor which is capable of being represented by such an input signal can be indicated with an instrument of this type.

As will appear later, the indicator of this invention has a high sensitivity as it is capable of producing a change in indications with a corresponding change in electrical input as small as one-tenth of one percent of the input range. Likewise, the indicators herein disclosed are capable of operation with negligible error with changes in line voltage of say 115 volts of from 95 to 130 volts. Such variations are not infrequently encountered in line voltages, and will cause in the systems herein disclosed, less than three-tenths of one percent error in calibration.

Figure 1:
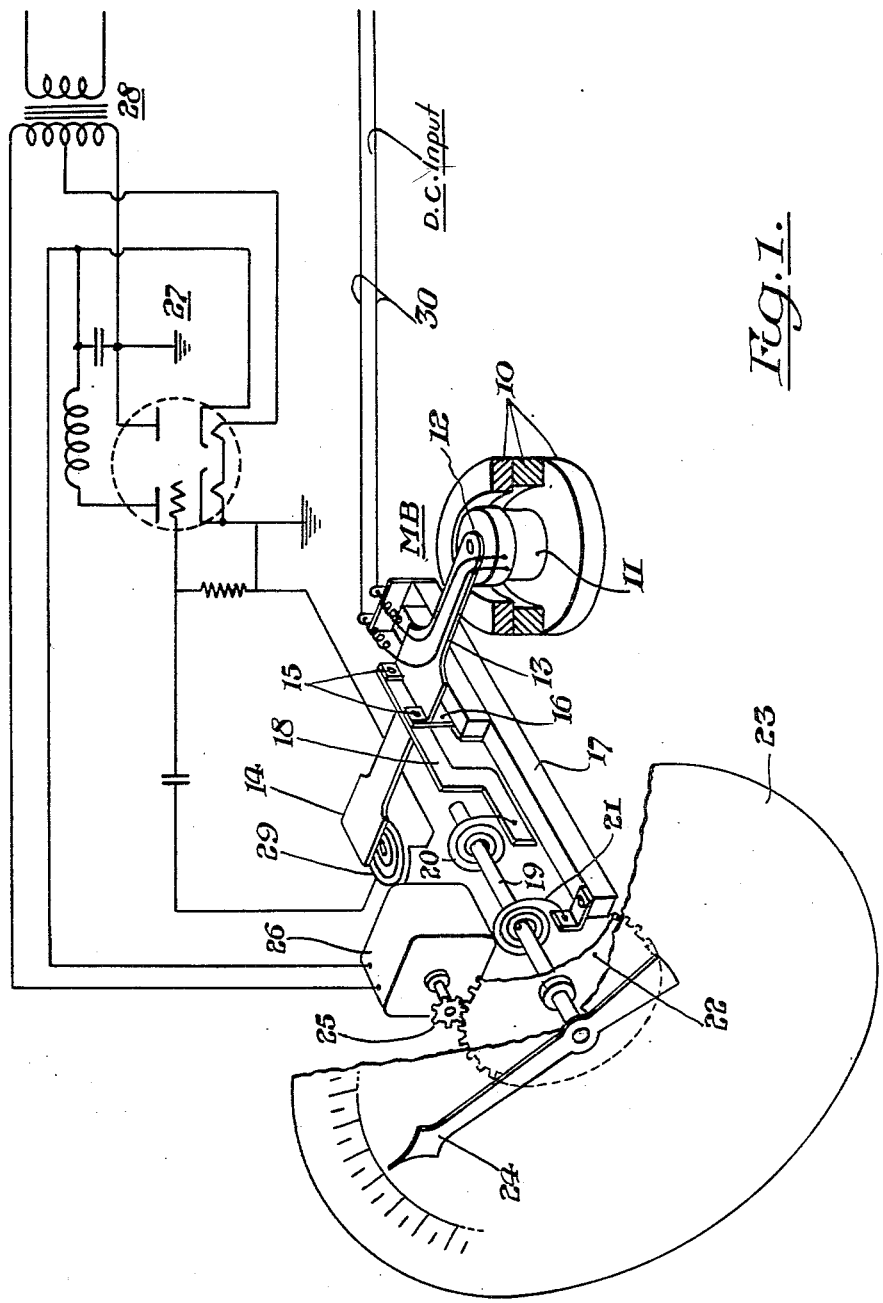

The indicator of Figure 1 is diagrammatically illustrated as including a galvanometer MB consisting of a permanently magnetized field structure 10 having a central pole piece 11 forming an annular magnetic field. Mounted in this field is an input coil 12 which consists of a suitable number of turns of wire mounted upon a cylindrical insulating form proportioned to telescope over the end of the pole piece 11. This coil form is rigidly attached to the end of a lever comprising the arms 13 and 14. This lever forms a beam and is preferably of metal, provided with a pair of upstanding tabs 15 which are either attached thereto or upstruck therefrom. These tabs are secured to the upper ends of a pair of resilient cantilever leaf springs 16 to which are also attached an arm 18. The cantilever springs 16 are anchored at their lower ends to a fixed support 17, in any suitable manner so as to be rigidly supported. These leaf springs provide a resilient pivotal support for the beam 13, 14 as distinguished from a pivotal support such as provided by a shaft and bearings. This construction eliminates the inherent difficulties encountered in pivotally supported shafts of which static friction is a particularly undesirable and inherent disturbing factor.

At 19 is a rotatable shaft on which is mounted the pointer 24 of the indicator. Shaft 19 will, of course, be rotatably mounted in suitable bearings, not shown, for the sake of simplicity. It extends through a suitably shaped dial, in this case a circular disc 23 having a calibrated scale on the face thereof with respect to which the pointer moves.

Shaft 19 is connected to the lever 18 by means of a spiral spring 20 having its inner end attached to the shaft 19 and its outer end to the lever 18. A smaller spiral spring 21 is attached to the shaft 19 at the inner end of the spring and has its outer end anchored to the fixed support 17. Mounted on the shaft 19 is a gear 22 which meshes with a driving pinion 25 mounted on the rotatable shaft of an electric motor 26.

The end 14 of the beam terminates in a flag which is arranged to move with respect to an oscillator coil 29 forming part of a combined oscillator and full wave rectifier 27. The power supply is through a transformer 28 which serves to energize the oscillator and under the control of the rectifier to provide an operating current to the electric motor 26. The oscillator and rectifier functions are performed by the combination triode and diode, the triode providing one-half of the full wave rectifier which includes the diode and also serves as part of the oscillator circuit.

The wires 30 are connected to the terminals of the input coil 12, as indicated, and are connected to the source, not shown, of low-impedance low-value direct current signals representative of the variable being measured. Specifically, for example, the wires 30 could be connected to a thermo-couple.

It will be understood that the spring 20 is suitably calibrated to provide a correctly proportioned connection between the movable lever 18 and the shaft 19. Spring 21 is provided to provide a return force to the pointer shaft 19.

The direct current input, varying in proportion to changes in the variable to be indicated, is fed through the circuit wires 30 to the input coil 12. The magnetic field accompanying the flow of the current through the coil 12 reacts upon the magnetic field of the permanent magnet structure of the galvanometer, causing displacement of the lever 13 forming part of the beam, and likewise the other lever 14 of the beam with respect to the oscillator coil 29. This movement of the beam 13—14 is substantially a rotary movement permitted by the resilient leaf spring supports 16 for the beam intermediate its ends. The lever 18 is rigidly attached to the beam so that geometrically its plane is at right angles to the plane of the beam and will, therefore, be correspondingly rotated or tipped through an angle corresponding to that through which the beam moves.

The movement of the flag end of lever 14 with respect to the oscillator coil 29 detunes the oscillator 27 and correspondingly changes its output to provide an operating current for the alternating current motor 26 of a magnitude related to the displacement of the beam, which displacement is caused by the difference between the force produced by the direct current input in the circuit 30 and the balancing or feedback force produced by spring 20. This current will cause the motor 26 to operate the pointer 24 through the gears 25 and 22 to a position on the scale which indicates, when the scale is properly calibrated, the value of the direct current input. Shaft 19, of course, rotates with the pointer, distorting springs 21 and 20. Distortion of spring 20 will cause application of a force to lever 18 to oppose the magnetic force which displaced the beam 13—14, and thereby operates to reduce the power being delivered to the motor bringing it to rest as the forces applied to the galvanometer are brought into balance. Thus the pointer comes to rest and remains stationary until there is a change in the direct current input either by increase or decrease. If there is an increase in input signal in circuit 30 the current to the motor 26 will be increased, moving the pointer correspondingly upscale until the resultant accumulation of stress in the spring 20 restores the galvanometer to balance, reducing the current to the motor and bringing it to rest at a new position, indicating the change in value.

On the other hand, if the vaue of the direct current input decreases, the output of the oscillator will be correspondingly decreased, reducing the torque generated by the motor 26, whereupon spring 21 will move shaft 19, and hence the pointer 24 downscale to a point where the torque produced by spring 20 will again be in balance with the new value of input in circuit 30 and at the same time reduce the current to motor 26 through the operation of the electronic control circuit, bringing the motor and pointer to rest indicating this new value. In other words, increases in the output current of the oscillator cause motor 26 to drive the pointer upscale, correspondingly stressing spring 21, while decreases in the oscillator output correspondingly reduce the torque of motor 26, permitting stressed spring 21 to return shaft 19 and pointer 24 downscale to the new value. These movements of the shaft 19, acting through the calibrated spring 20, serve to apply a balancing force to the lever 18, and hence to the beam 13—14 to balance the force of reaction of the magnetic field of coil 12 on the permanent magnetic field of the galvanometer. Of course, the stressing of leaf spring 16 will form a part of this action, but within the small ranges of movement of the beam 13—14. The forces interposed by the leaf spring 16 being substantially constant permit calibrated spring 20 to provide the major and active portion of the mechanical force which balances the magnetic force of the galvanometer.

Figure 2:
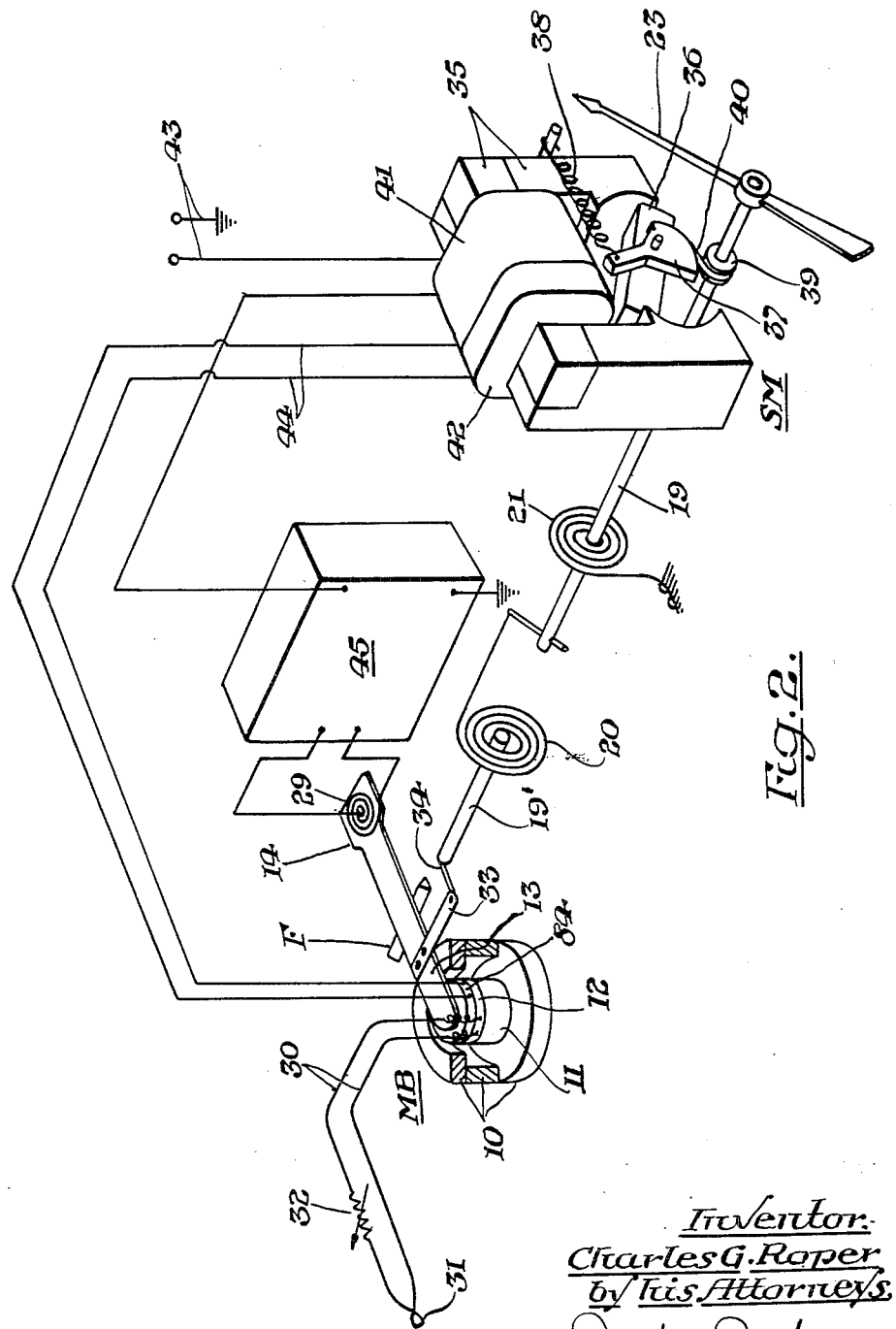
Figure 2 is a similar view of a modified indicator employing a solenoid motor as distinguished from a rotating motor to operate the indicator, further characterized by the provision of an electro-magnetic dampening means.

In the system of Figure 2 there is illustrated a combination generally similar to that of Figure 1, but different in several important aspects. In the first place, instead of a rotary motor, that is motor 26 of Figure 1, in the system of Figure 2 there is employed what may be termed a solenoid motor of which the armature rotates only through a fraction of a revolution for full scale movement of the pointer. The associated electronic circuit has been modified to accommodate for this change in motor characteristics. This circuit is only diagrammatically illustrated in Figure 2, but is shown in full detail in Figure 3. The other main difference is that in the system of Figure 2 there is provided electro-magnetic means for dampening the movement of the beam to prevent hunting and over-shooting of the indicator.

In this system the galvanometer MB, comprising the permanent magnetic field 10—11, the input coil 12 and the beam 13—14, is the same as in the previous system. In this figure the pivotal support for the beam is shown diagrammatically by the fulcrum member F, but it will be understood that a resilient spring support like that of Figure 1 would normally be used. In this arrangement, as shown, the portion 13 of the beam is provided with a transversely extendnig lever 33, movable therewith. Lever 33 is connected by a rigid link 34 to an extension shaft 19'. Functionally the lever 33, the link 34. and the shaft 19' are the equivalent of the lever 18 of Figure 1. The inner end of a spiral spring 20 is attached to the shaft 19' and the outer end is connected by a rigid link, as shown, to one end of the pointer shaft 19, which as before is journaled in suitable bearings, not shown. The structure represented by the parts 33, 34 and 19' is simply an extension from the beam 13—14, arranged to provide a support for the center of the spring 20 so as to align the center of the spring 20 with the axis of rotation of the beam. The return spring 21, as in the previous case, has one end anchored to a fixed support and its inner end attached to the shaft 19. The input circuit 30 in Figure 2 is shown connected to a thermo-couple 31 in series with which is an adjustable calibrating resistance 32. In this arrangement instead of a rotating motor 26, a solenoid motor SM is provided having a magnetizable field 35 of suitable shape in the air gap of which is oscillatably mounted a magnetizable armature 36. Mounted on the armature 36 so as to be on the center of its rotation is a segment shaped piece 37 which is connected by a cord 40 to a sleeve 39 attached to the shaft 19. One end of the cord 40 is attached to the segment 37 and the other end is attached to the sleeve 39. This type of drive is adaptable to this use because it permits of the assembly of the solenoid unit to the galvanometer unit without the necessity for close control of tolerances in the assembly operation.

The return spring 21 is provided in order to permit this drive to function properly. The segment 36 is provided with a radial extension to which one end of a coiled tension spring 38 is anchored. The other end of this spring is anchored on the motor stator, as shown. This spring provides the return force for the armature. It will be seen that spring 21 provides a return force for the shaft 19 so that on return or downscale movements the cord of the Gold belt drive will be kept under tension.

The magnetizable field structure 35 is provided with a magnetizing winding 41, to one terminal of which a suitable current source, to be described, is connected by means of the wires 43. Inductively associated with the winding 41 on the field structure 35 is a winding 42 which is connected by the circuit wires 44 to the winding 84 which provides the magnetic means by which the rate at which the magnetic field in winding 41 is measured to apply a counterbalancing magnetic force to the beam to dampen its movement. It will be understood that the windings 12 and 84 are wound on a sleeve, which telescopes over the end of the cylindrical pole 11 of the galvanometer, and which is rigidly attached to the beam 13—14 for movement therewith. The oscillator is shown diagrammatically at 45 and in full detail in Figure 3.

Figure 3:
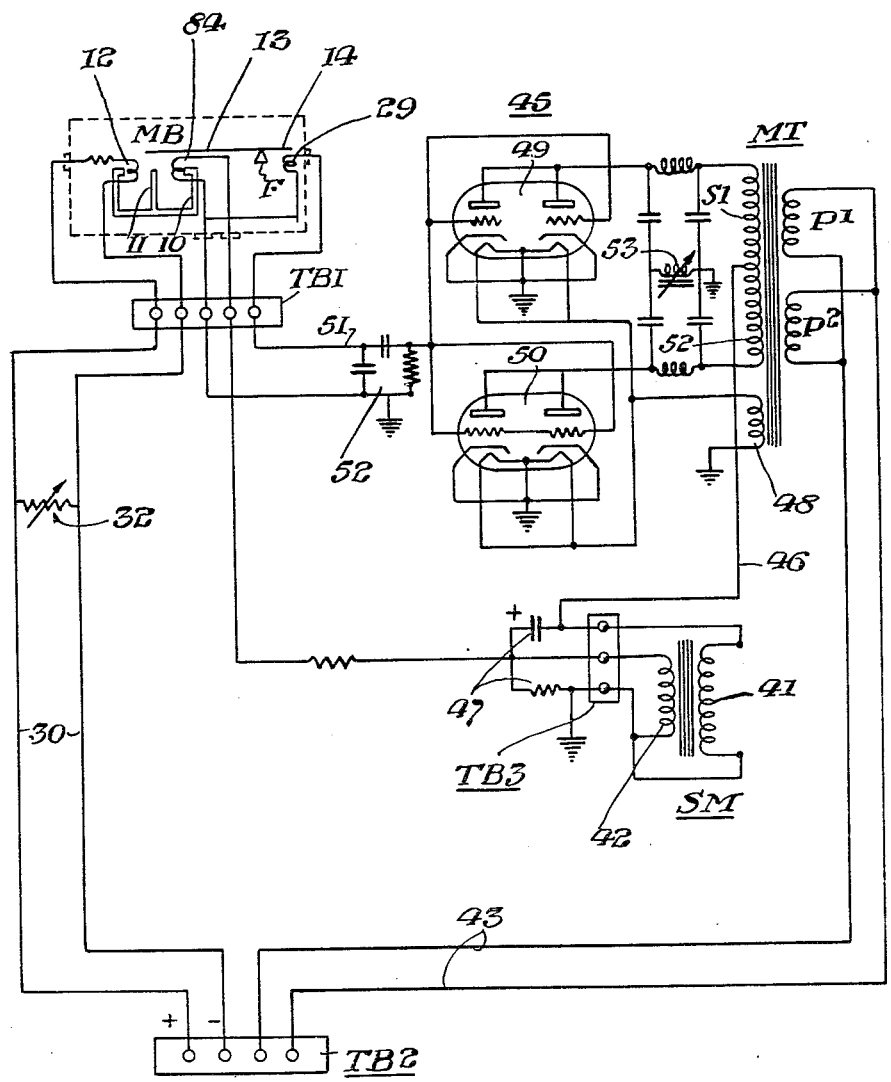
Figure 3 is a diagrammatic more detailed disclosure of the circuit elements and connections used in the system of Figure 2 and capable of use with modifications in the system of Figure 1.

The circuits of the system of Figure 2 are shown in greater detail in Figure 3. The galvanometer MB is diagrammatically illustrated as comprising, as before, the magnetized field member 10—11, with which is associated the beam 13—14 on the fulcrum F, the signal input coil 12, and the oscillator tuning coil 29. In addition a dampening coil 84 is wound on the coil form which supports the input coil 12. The leads 30 extend from the terminal board TB–2 to the corresponding connectors on the terminal board TB–1, and from there to the input coil 12. The thermo-couple or other low voltage direct current signal input source is connected to the terminals of the terminal board TB–2, to which the leads 30 are connected. The potentiometer 32 is connected across the leads 30 to provide a calibrating resistor of suitable range.

The two remaining terminals of the terminal board TB–2, which are to be connected to a suitable current source, such as 115 volt A. C. line, have connected thereto the leads 43 which energize the primaries P–1 and P–2 of the main transformer MT. This transformer is provided with a secondary providing two sections S–1 and S–2 by reason of the central tab connection 46. The outer terminals of this secondary are connected to the plates of a pair of dual triodes 49 and 50. The grids of these tubes are connected in parallel to a grid-biasing network 52 across which the terminals of the oscillator tuning coil 29 are connected through the terminal board TB–1. One terminal of the magnetic dampening coil 84 is connected to ground through the terminal board TB–1 and the other terminal is connected through the same terminal board to the ungrounded terminal of the winding 42 of the motor SM. The plate and grid circuits of the dual triodes 49 and 50 are interconnected to provide a full wave rectifier, and a push-pull oscillator, of which the variable inductance 53 comprises the tuning element. The filaments or heaters of the dual triodes are energized through a separate secondary 48 of the main transformer MT.

The center tap of the secondary S–1, S–2, is connected by wire 46 to one terminal of the field winding 41 of the motor SM, the other terminal of which is grounded through to terminal board TB–3. The network 47 comprises a by-pass circuit to ground for the alternating current components of the direct current output of the rectifier, also provided by the dual triodes. The oscillator and rectifier circuits of the dual triode push-pull amplifiers and rectifiers are of themselves well known in the electronic arts.

This arrangement provides adequate power to operate the solenoid motor SM through the use of a push-pull control oscillator and rectifier circuit. As is well known, in this arrangement the tubes operate on the positive half cycle of their excitation and the current which flows through them depends upon the grid bias which is a function of the radio frequency voltage of the oscillating action.

The rectified component of each of the electron tubes is fed through the coil 41 of the solenoid motor which is in the transformer center tab circuit 46 to the cathode circuit of the amplifier. Movements of the beam 13—14 of the magnetic balance tunes the high frequency oscillator coil 29 to control this current.

It will be noted that the winding 42, inductively related to the winding 41, is connected to the balancing coil 84 of the galvanometer and, therefore, serves to measure the rate at which the magnetic field is changing in the motor SM. The coil 84 applies a magnetic force to the galvanometer beam which tends to oppose the change in movement thereof which the magnetic field of the input coil 12 is causing in response to the input signal. This circuit is the stabilizing circuit for the instrument and serves as the dampening means therefor. The rate of change at the output is measured and fed back inversely in a manner to reduce the speed at which the indicating pointer can move. Thus the tendency of the pointer to overshoot is minimized, and any tendency of the indicator pointer to oscillate is reduced.

By reason of the gearing up action of the Gold cord drive, very small movements of the armature 36 can be translated into ample movements of the pointer 23, thus providing for adequate scale indications with small movements of the armature of the solenoid motor SM.

As in the previous arrangement the spiral spring 20 serves to apply, through its connection to the pointer shaft 19, a calibrated mechanical force to the beam 13—14 to oppose its movements under the influence of the magnetic field of the input coil 12.

From this description and the embodiment of the invention herein disclosed, it will be apparent that the objects of the invention as set out at the beginning of this specification are attained in a relatively simple and practical manner. Those skilled in the art will appreciate that changes in the details of construction and operation may be made without departing from the attainment of the objects of this invention. I do not, therefore, desire to be strictly limited to the specific embodiment of the invention herein disclosed.

What is claimed is:

1. In a system of the type described, the combination comprising means providing a fixed magnetic field, a pivotally mounted beam, an input coil in said magnetic field and connected to said beam, an oscillator having a circuit the loading of which is varied by the actuation of said beam, a rotatably mounted shaft having a pointer, resilient means for interconnecting said shaft with said beam, a motor energized by said oscillator for rotating said shaft in one direction, and a spring connected to said shaft so as to be stressed, upon operation of said shaft in upscale direction, to tend to operate the shaft in the opposite direction, displacement of said pointer being proportional to the force produced by the application to said coil of the current to be measured and as counterbalanced by the force produced by said resilient means.

2. In the combination of claim 1, said motor being a direct current motor, and means for rectifying the output of the oscillator to supply direct current energization to said motor.

3. In the combination of claim 1, a second coil mounted on said beam, and means for supplying an induced current resulting from changes in the field of said motor to said second coil to dampen the movements of said beam.

4. In the combination of claim 1, means inductively associated with the field of said motor for generating a current proportional to the rate at which the magnetic field of the motor is changing, and means mounted on said beam and connected to said last means to provide a magnetic force opposing the movement of said beam by said input coil.

5. An indicating instrument comprising in combination a graduated scale, a pivotally supported pointer movable over said scale, a galvanometer having a resiliently supported beam, a magnetized field member and an input coil attached to said beam and mounted in the magnetic field of said member, a spring connecting said pointer to said beam, an electric motor for driving said pointer upscale, a spring connected to said pointer for driving it downscale, an electronic oscillator having a tuning coil positioned adjacent said beam, means connected to said input coil for applying direct current signals to it, representing the values of a changing quantity to be measured, and circuit connections from the output of said oscillator to said electric motor for supplying an operating current therefor.

6. In the combination of claim 5, means in said circuit connection for rectifying the output of said oscillator.

7. In the combination of claim 5, a second coil mounted on said beam and positioned in the magnetic field of said member, and means connected thereto and inductively associated with the field of said motor to apply a counterbalancing force to said beam to stabilize its movements.

8. In the combination of claim 5, magnetic means mounted on said beam and energizing means therefor forming part of said motor for generating a current varying in accordance with the rate at which the magnetic field of the motor is varying.

9. A measuring instrument combination comprising a pivoted pointer, an electric motor for applying torque to said pointer to rotate it in one direction, a spring acting to rotate said pointer in the opposite direction, a force-balance galvanometer having a displaceable beam, magnetic means to be actuated by a direct current signal for applying a displacing force to said beam, a calibrated spring connecting said beam and pointer, current generating means controlled by movement of said beam, and a circuit connecting said generating means to said motor.

10. In the combination of claim 9, said current generating means comprising an oscillator having a tuning element positioned adjacent said beam and controlled by its movements.

11. In the combination of claim 9, said current generating means comprising an oscillator having a tuning element positioned adjacent said beam and controlled by its movements, and a rectifier for rectifying the output of said oscillator.

12. In the combination of claim 9, said current generating means comprising an oscillator having a tuning element positioned adjacent said beam and controlled by its movements, a rectifier for rectifying the output of said oscillator, a dampening coil connected to said beam, and means forming part of said motor for supplying energizing current to said coil proportional to the rate of change of energization of said motor.

References Cited in the file of this patent

UNITED STATES PATENTS

| | | |
|---|---|---|
| 2,005,884 | Bernarde | June 25, 1935 |
| 2,117,894 | Lenehan | May 17, 1938 |
| 2,154,260 | Brandenburger | Apr. 11, 1939 |
| 2,234,184 | MacLaren, Jr. | Mar. 11, 1941 |